United States Patent [19]
Hampel

[11] Patent Number: 6,033,166
[45] Date of Patent: Mar. 7, 2000

[54] RAIL MILLING MACHINE

[75] Inventor: Barry Francis Hampel, Carlyle, Ill.

[73] Assignee: Koppers Industries, Inc., Pittsburgh, Pa.

[21] Appl. No.: 09/140,927

[22] Filed: Aug. 27, 1998

[51] Int. Cl.[7] ............................... B23C 1/20; E01B 31/13
[52] U.S. Cl. ......................... 409/175; 409/180; 409/183; 409/178
[58] Field of Search ................................. 409/138, 175, 409/180, 183, 204, 206

[56] References Cited

U.S. PATENT DOCUMENTS

| 844,100 | 2/1907 | Collet | 408/138 |
|---|---|---|---|
| 1,718,324 | 6/1929 | Wappat | 408/138 |
| 3,888,052 | 6/1975 | Panetti . | |
| 4,492,059 | 1/1985 | Panetti . | |
| 4,583,893 | 4/1986 | Line | 409/296 |
| 4,596,092 | 6/1986 | Panetti . | |
| 4,829,723 | 5/1989 | Bull et al. . | |
| 5,549,505 | 8/1996 | Jaeggi | 409/298 |
| 5,752,402 | 5/1998 | Barnes | 409/138 |

OTHER PUBLICATIONS

Geismar Modern Track Machinery, Inc., advertisement of Stock Rail Grinder, Model MC–3 (publication date unknown).

Primary Examiner—Steven C. Bishop
Attorney, Agent, or Firm—Thomas Lizzi; Barry I. Friedman; Sweeney Metz Fox McGrann & Schermer, LLC

[57] ABSTRACT

An apparatus for the field milling of a pocket into a railroad stock rail to accommodate the precise nesting abutment of a switch point rail thereto avoids the necessity of milling such pockets under shop conditions and permits the use of Continuous Welded Rail (CWR) through railroad switches. The portable, self-propelled apparatus is adapted to the field milling of pockets into stock rails to accept the selectable placement of a movable switch rail therein and is powered by a portable power supply that may be either auxiliary or integral. The apparatus comprises components which are preferably fluid-powered. The apparatus clamps onto the stock rail and comprises a positionable milling assembly inclined at the angle necessary for milling the desired pocket into the stock rail. The apparatus moves the apparatus along the stock rail at a controlled speed whereby the milling head is fed along the stock rail during the milling operation.

36 Claims, 8 Drawing Sheets

RAIL MILLING MACHINE

FIELD OF THE INVENTION

The invention relates to an apparatus for milling railroad rails. More specifically, the invention relates to a self-propelled, portable milling machine for the field milling of a railroad stock rail to accommodate the precise nesting abutment of a switch point rail thereto.

BACKGROUND OF THE INVENTION

Description of the Prior Art

Railroads today almost universally employ the split switch design. The split switch is composed of a switch proper for the diversion of the wheels, a frog to carry the wheel flanges across opposing rails, lead rails between the frog and the switch proper, guardrails to prevent batter and misrouting at the frog point, and a set of switch ties to support the assemblage. The switch proper includes a set of fixed stock rails and a movable pair of switch point rails. Each switch point rail has a knife-edged free end, called a point, and a pivotally fixed end, called a heel. Depending on which way the switch is thrown, the stock rail side of the point of one or the other of the switch point rails fits snugly against the gauge side of the adjacent stock rail.

Figure 1:
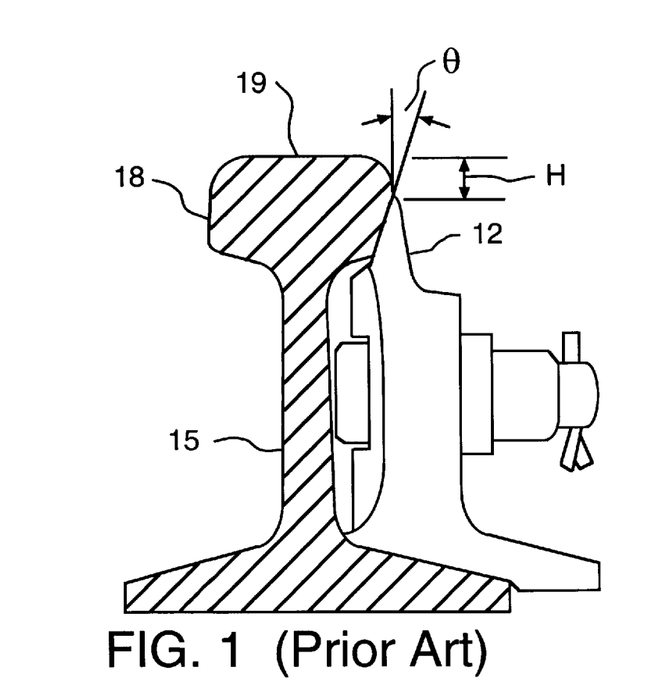
FIG. 1 is an end cross-sectional view of a prior art Samson Switch point design at the location of the point of the switch rail.

In order to protect the point from direct battering contact with the train wheels, a pocket is usually milled into the gauge side of the head or ball of the stock rail to accommodate the precise nesting abutment of the point and a lateral portion of the switch point rail of which it is a part. The most commonly used design is the Samson Switch point design as illustrated in FIG. 1. FIG. 1 shows switch rail point 12 in nesting abutment with stock rail 15 at the point of the switch. The Samson Switch point design requires that the stock rail pocket be milled into the rail head 18 position starting 0.5 inches vertically down from the horizontal plane containing rail head top surface apex 19, that is at distance H, and at an angle θ of 18 degrees 25 minutes with the pocket extending 9 to 24 feet in length, depending on the switch, with lead-in and lead-out taper zones each 3 inches in length.

Heretofore, in order to obtain the required precision repeatably and efficiently, the stock rail pocket had to be machined under shop conditions rather than in place in the field. Although such pockets can be field formed by hand-operated grinders, such grinders are difficult to control, subject the rail to localized overheating, require a long time to form the pocket, and the results greatly depend on the skill and patience of the operator. The necessity of shop milling produces the significant and costly disadvantage that where the track line consists of continuous welded rail (CWR), the up to quarter mile long sections of ribbon rail that otherwise comprise the CWR rail line cannot be used as the rail through either the curved side or the straight side of a switch. Instead, the rail through each side of a switch must be made up of several short sections of rail in order that one of them can have the necessary pocket milled into it under machine shop conditions. It is, therefore, necessary, at least on the straight side of the switch, to field weld the several short rails to each other as well as to the ribbon rail on each end of the switch. For the curved side of the switch, either welding or bolting may be used to join together the several sections of short rail depending on the nature of the switch. The disadvantage is compounded by the fact that due to the spatial confinements imposed by the hardware associated with a switch, automated field welding equipment cannot be used to make the field welds of the several switch short rail sections. Thus, it is necessary to rely on the labor-intensive and time-consuming practice of manual field welding to make these several field welds. Typically, the set-up, welding, and grinding associated with each manual field weld takes a two-man crew on the order of two hours to complete making manual welds expensive to perform.

Therefore, there is a need that has existed since the introduction of CWR in the 1930's for a simple to operate means and a simple to perform method for field machining stock rail pockets into CWR rail that are capable of producing consistently reproducible, precise milling results efficiently and cost effectively.

SUMMARY OF THE INVENTION

A method and apparatus are disclosed herein for the field machining of stock rail pockets, such as the pocket used, for example, in the Samson Switch point design. These pockets are field milled, that is, milled in situ directly into the CWR rail thus eliminating the need for the several manual field welds that are presently required for joining the several short rail sections of a switch into the CWR rail line. The method and apparatus are intended to be cost-competitive with the present practice of shop machining the pockets into the stock rail and field welding the several short rail sections into the CWR rail line. Additionally, the apparatus is simple to operate so as to not require the services of highly skilled machinists on the field crews. Furthermore, in order to insure the safe operation of the switches and to safeguard against possible train derailments caused by point wear and switch point misalignment, the method produces a consistently reproducible, precise milling result.

The present invention fulfils the need that has existed in the art for decades of years for simple means and methods for field machining stock rail pockets into CWR, and other types of rail, that are capable of producing consistently reproducible, precise milling results efficiently and cost effectively.

The present invention has the advantage over the prior art that it provides the ability to field mill, that is, mill in situ, a pocket into a stock rail for receiving a switch rail point in precise nesting abutment such as required by the Samson Switch point design. The present invention also provides the advantage of field milling a pocket into a stock rail which utilize an apparatus which is simple to operate such that a skilled machinist is not required on a field crew. An apparatus is provided for field milling a pocket into a stock rail which is easily transported to a field site by a crew truck, and is rugged enough for day-to-day field use by a railroad crew without the need for significant maintenance.

The present invention can be powered by a portable supply of power which may be either auxiliary to or an integral part of the device, and may be self-propelled during the milling operation such that a pocket for receiving a switch point into a stock rail can be milled in about two hours or less. The device is intended to be adaptable for use on any size of rail, and can be used regardless of whether the stock rail being milled is a section of CWR or other type of rail. The present invention can field mill a pocket without causing an increase in temperature of the rail sufficient to significantly affect the tension state of the rail.

Other features and advantages inherent in the subject matter claimed and disclosed will become apparent to those skilled in the art from the following detailed description of presently preferred embodiments thereof and to the appended drawings.

BRIEF DESCRIPTION OF THE DRAWINGS

The criticality of the features and merits of the present invention will be better understood by reference to the attached drawings wherein similar reference characters denote similar elements throughout the several figures. It is to be understood, however, that the drawings are designed for the purpose of illustration only and not as a definition of the limits of the present invention.

DESCRIPTION OF PREFERRED EMBODIMENTS

FIG. 1 shows a Samson Switch point design having switch rail point 12 in nesting abutment with stock rail 15 at the point of the switch. The Samson Switch point design requires that the stock rail pocket be milled into the rail head 18 at a position starting 0.5 inches vertically down from the horizontal plane containing rail head top surface apex 19, that is at distance H, and at an angle θ of 18 degrees 25 minutes with the pocket extending 9 to 24 feet in length, depending on the switch, with lead-in and lead-out taper zones each 3 inches in length.

Figure 2:
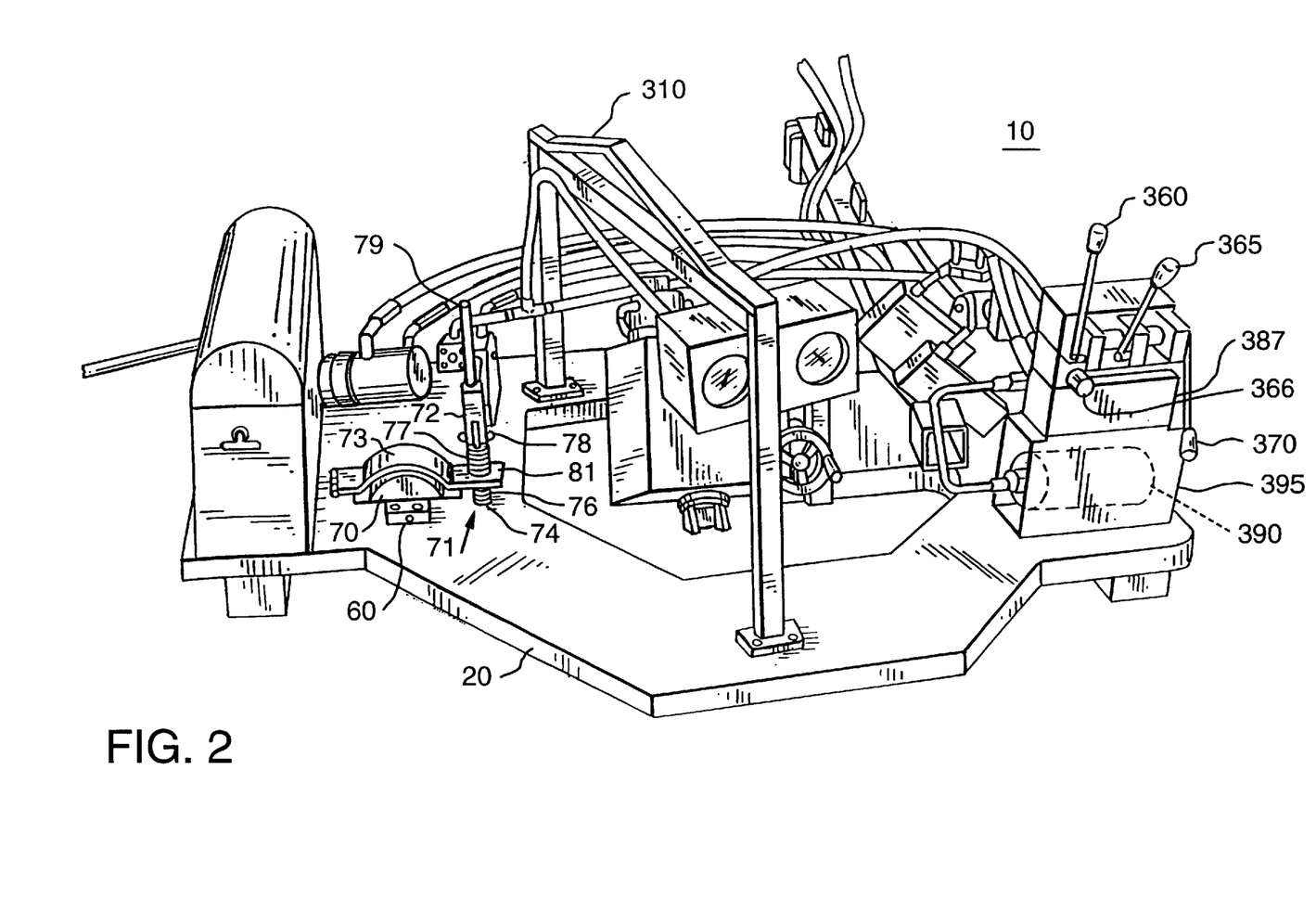
FIG. 2 is a side perspective drawing of the rail milling apparatus.
Figure 3:
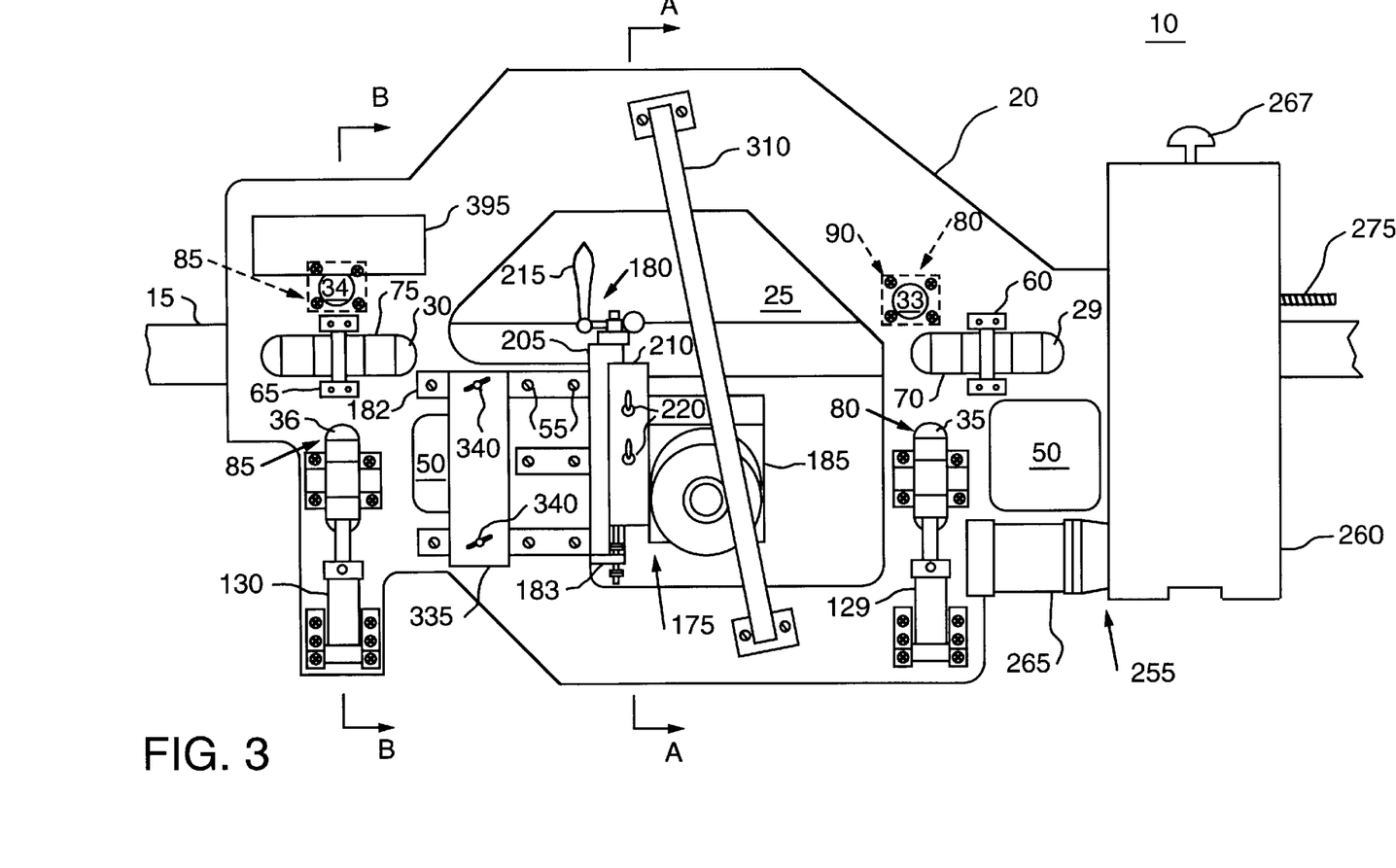
FIG. 3 is a top plan schematic view of the rail milling apparatus mounted upon a stock rail that is to be milled.

FIGS. 2 and 3 illustrate apparatus 10 according to the present invention which is powered by an auxiliary recirculating hydraulic pump. Base plate 20 is preferably made of 2 inch thick steel plate cut to such a configuration as to provide apparatus 10 with sufficient strength, stiffness, and ruggedness to permit apparatus 10 to produce consistently reproducible, precise milling results while minimizing the weight of apparatus 10. Base plate 20 contains mill aperture 25, front and rear support roller apertures 29, 30, front and rear stationary clamp roller adjustment access apertures 33, 34 and front and rear clamp roller lever arm apertures 35, 36. Optionally, base plate 20 may contain one or more lightening apertures 50 for the purpose of reducing the weight of apparatus 10 and thereby enhance its portability.

Apparatus 10 also comprises a number of components which are removably attached to base plate 20 by, for example, screws 55 or other removable fasteners. However, one or more of the components may be attached to base plate 20 by welding or by other permanent means known to those skilled in the art. Front and rear support roller mounts 60, 65 are affixed to base plate 20 and support front and rear support rollers 70, 75, respectively. Front and rear support rollers 70, 75 support apparatus 20 on rail 15 during the milling operation.

Referring to FIG. 2, front roller brake assembly 71 is attached to base plate 20. Front roller brake assembly 71 comprises brake lock 72, arcuate brake pad 73, and spring 74. Brake lock 72 comprises lower section 76, collar 77, brake lock pivot 78, and brake lock lever handle 79. The bottom end of brake lock lower section 76 is threadably attached to base plate 20 and is pivotally attached to brake lever handle 79 by means of brake lock pivot 78. Arcuate brake pad 73 is pivotally attached at one end to base plate 20 in close proximity to front support roller 70. Brake lock lower section 76 is fitted through a hole in brake pad flat section 81. Spring 74 is fitted around brake lock lower section 76 between base plate 20 and the bottom of brake pad flat section 81. Collar 77 slidably fits around brake lock lower section 76 between the top side of brake pad flat section 81 and brake lock pivot 78. When brake lock lever handle 79 is aligned coaxially with brake lock lower section 76, spring 74 lifts arcuate brake pad 73 away from front support roller 70 thereby allowing front support roller 70 to freely rotate and apparatus 10 to freely roll on rail 15. When brake lock lever handle 79 is locked into a position perpendicular to brake lock lower section 76, brake lock lever handle 79 forces collar 77 against the top side of brake pad flat section 81 compressing spring 74 and bringing the bottom surface of brake pad 73 into contact with the top surface of front support roller 70 thereby restraining the free rotation of front support roller 70. Brake lock 72 is used during the milling operation to regulate the constancy of the milling feed rate by controlling the speed of travel of apparatus 10 along rail 15.

Referring to FIG. 3, front and rear pinch roll assemblies 80, 85 are attached to base plate 20, which are used to clamp apparatus 10 to rail 15 during the milling operation. Front and rear pinch roll assemblies 80, 85 are of similar construction, therefore only the components of rear pinch roll assembly 85 will be described in detail.

Figure 4A:
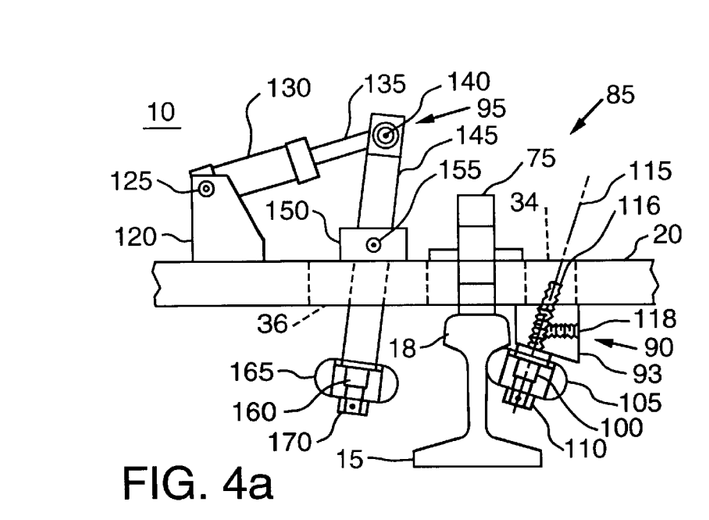
FIG. 4A shows a cross-sectional view taken along line B—B of FIG. 3 showing a first embodiment of a clamping roller assembly in the open position.
Figure 4B:
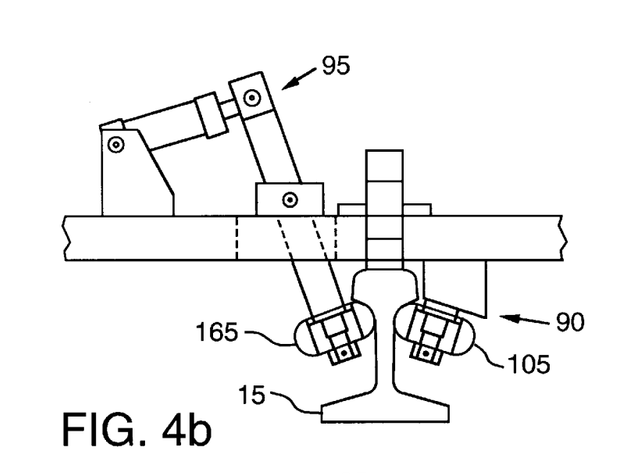
FIG. 4B shows a cross-sectional view taken along line B—B of FIG. 3 showing a first embodiment of a clamping roller assembly in the clamped position.
Figure 4C:
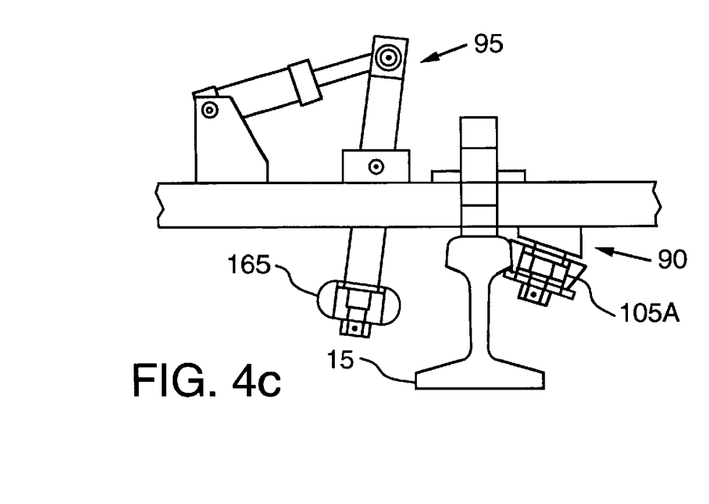
FIG. 4C shows a cross-sectional view taken along line B—B of FIG. 3 showing a second embodiment of a clamping roller assembly in the open position.
Figure 4D:
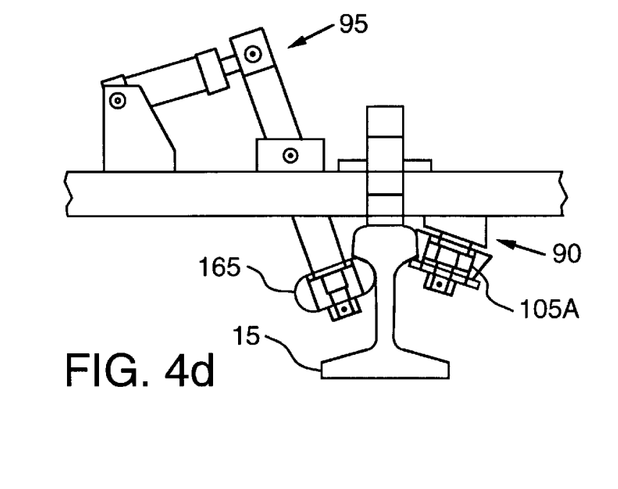
FIG. 4D shows a cross-sectional view taken along line B—B of FIG. 3 showing a second embodiment of a clamping roller assembly in the clamped position.

Referring to FIG. 4A, rear pinch roller assembly 85 includes adjustable stationary clamping assembly 90 and movable clamping assembly 95. Adjustable stationary clamp assembly 90 and movable clamping assembly 95 work together as complimentary pincers to clamp apparatus 10 on rail head or ball 18 of stock rail 15. FIGS. 4A and 4C each show the movable clamping assembly 95 in the open or retracted position that is used for facilitating locating and removing apparatus 10 with respect to track 15. FIGS. 4B and 4D each show movable clamp assembly 95 in the closed or clamping position in which pinch roller assembly 85 acts to firmly clamp apparatus 10 to rail 15 while still allowing longitudinal rolling displacement of apparatus 10 therealong by clamping rail 15 between rear first pinch roller 105 of adjustable stationary clamping assembly 90 and second pinch roller 165 of movable clamping assembly 95. In other words, as shown in FIGS. 4B and 4D, apparatus 10 is translatably clamped to rail 15 by means of clamping assembly 95. Preferably, first and second pinch rollers 105, 165 are made of a hard, durable material such as heat treated 4140 steel.

Referring to FIG. 4A, adjustable stationary clamping assembly 90 comprises bracket 93, spindle 100, first pinch roller 105, and retaining nut assembly 110. Bracket 93 of clamping assembly 90 is fixedly attached to base plate 20. Spindle 100 is adjustably attached to bracket 93 by way of adjustment stud 116 of spindle 100 so that spindle 100 maybe extended or retracted along axis 115 in order to level apparatus 10 on rail 15 by advancing or retracting adjustment stud 116. Adjustment stud 116 is accessed through rear stationary clamp roller adjustment access aperture 34 and locked into place by tightening adjustment stud locking screw 118 against the side of adjustment stud 116. Preferably, adjustment stud locking screw 118 is made of or is tipped with brass or some other material which is not likely to damage the threads of adjustment stud 116. First pinch roller 105 is rotatably mounted on spindle 100 and retained thereon by means of retaining nut assembly 110. Advancing or retracting adjustment stud 116 adjusts the vertical distance that first pinch roller 105 is from base plate 20. Note that, as shown in FIG. 4A and 4B, first pinch roller 105 has a round profile. Alternate embodiment first pinch roller 105A, which is shown in FIG. 4C and 4D has a flanged profile adapted to conform to the lateral surface of rail head 18.

Movable clamping assembly 95 comprises piston mount 120, piston mount pivot 125, rear double-acting piston 130, piston arm 135, piston lever arm connecting pivot 140, lever arm 145, lever arm mount 150, lever arm pivot 155, second spindle 160, second pinch roller 165, and second retaining nut assembly 170. Piston mount 120 is fixedly attached to base plate 20. Rear double-acting piston 130 is pivotally attached to piston mount 120 by means of piston mount pivot 125. Piston arm 135 of rear double-acting piston 130 is pivotally attached to lever arm 145 by means of piston lever arm connecting pivot 140. Lever arm mount 150 is attached to base plate 20 and pivotally attached to lever arm 145 by means of lever mount pivot 155. Lever arm 145 extends through rear clamp roller lever arm aperture 36 through base plate 20. Second pinch roller 165 is retained by second retaining nut assembly 170 on second spindle 160. Second spindle 160 is attached to lever arm 145. Energizing rear double-acting piston 130 to retract piston arm 135 causes second pinch roller 165 to press against rail 15 thereby forcing rail 15 into contact with first pinch roller 105 with sufficient force to clamp apparatus 10 to rail 15 while allowing longitudinal displacement of apparatus 10 therealong. Energizing rear double-acting piston 130 to extend piston arm 135 causes second pinch roller 165 to pull away from rail 15 thereby releasing apparatus 10 from rail 15.

In the embodiments shown in FIGS. 4A, 4B, 4C, and 4D adjustable stationary clamp assemblies 90 of both front and rear pinch roll assemblies 80, 85 are mounted on base plate 20 so as to contact the field side of rail 15 and the corresponding movable clamping assemblies 95 are mounted on base plate 20 so as to contact the gauge side of rail 15. However, the reverse arrangement of mounting adjustable stationary clamp assemblies 90 so as to contact the gauge side of rail head 18 and mounting movable clamping assemblies 95 to contact the field side of rail head 18 is also within the contemplation of the present invention.

Figure 5:
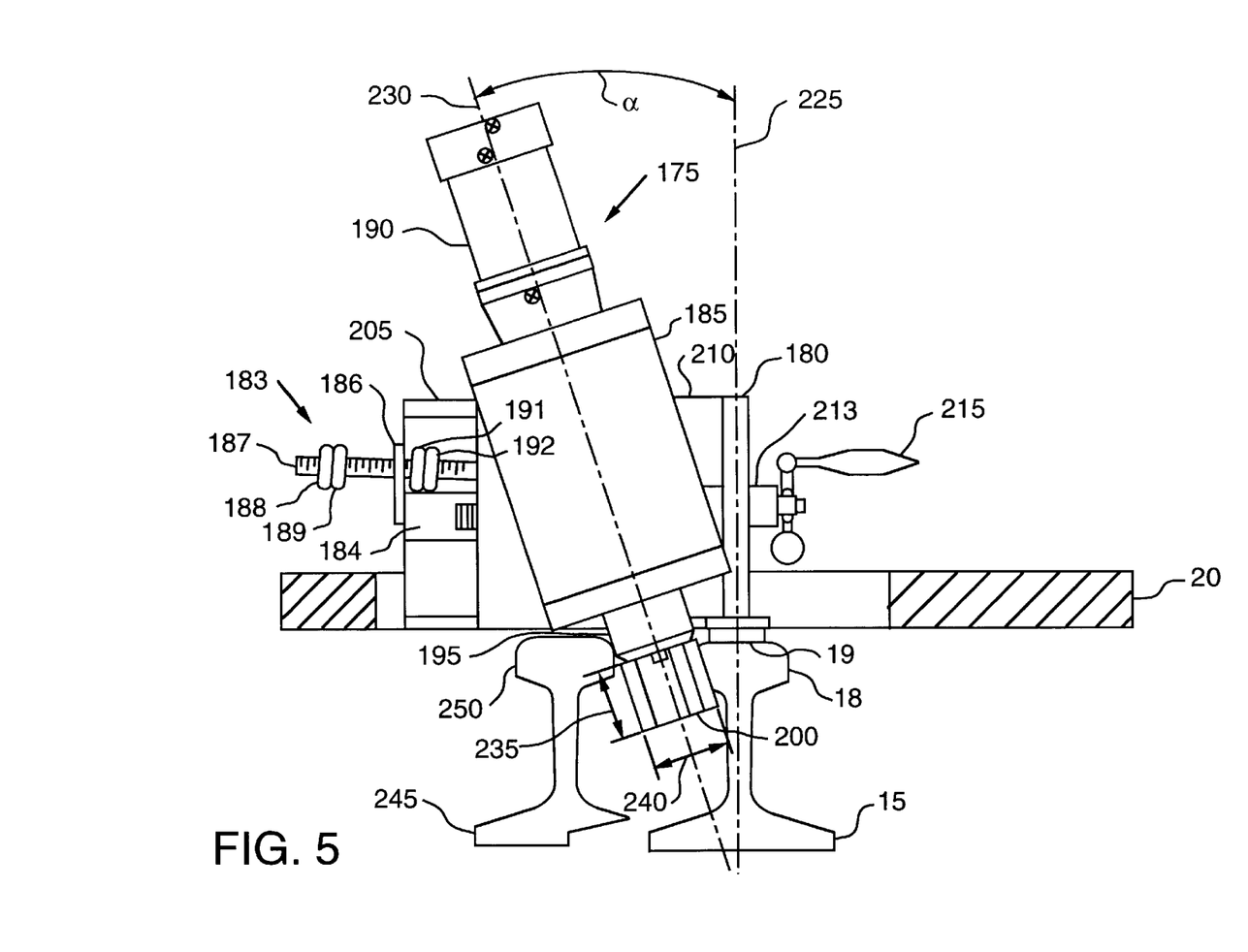
FIG. 5 shows a cross-sectional view taken along line A—A of FIG. 3 of the rail milling apparatus.

Referring now to FIGS. 3 and 5, mill assembly 175 is attached to base plate 20. Mill assembly 175 is comprised of slide mount 180, slide stop 183, mill motor mount 185, mill motor 190, mill spindle assembly 195, and mill head 200. Referring to FIG. 3, slide mount 180 comprises fixed slide 205 and movable slide 210. Fixed slide 205 and movable slide 210 are joined together with dove-tail slide joint 184 and micrometer mechanism 213 so that the position of movable slide 210 relative to fixed slide 205 can be precisely and repeatably controlled to within a thousandth of an inch by turning micrometer handle 215 and locked in place by slide position locking mechanism 220 to precisely and repeatably control the depth of cut of mill head 200 into rail head 18. Slide mount 180 is attached to base plate 20 by slide mount bracket 182 so that mill head 200 can be precisely positioned and locked in place along a horizontal line perpendicular to rail head 18. A dovetail slide assembly such as Model 200 manufactured by Master Machine Tools, Hutchinson, Kans., has been found suitable for use as slide mount 180 when modified to reduce the length of fixed slide 205 from 16 inches down to 12 inches.

Referring now to FIG. 5, slide mount 180 preferably includes slide stop 183 to limit the amount of travel of slide mount movable slide 210. By limiting the amount travel of slide mount movable slide 210 in the direction of rail 15, slide stop 183 prevents mill head 200 from being set to make too deep of a cut into rail head 18. By limiting the amount of travel of slide mount movable slide 210 in the direction away from rail 15, slide stop 183 acts to provide a convenient setting of movable slide 210 for parking mill head 200 whenever apparatus 10 is being located on or removed from rail 15. Slide stop 183 comprises stop bracket 186 which is affixed to slide mount stationary slide 205, stop rod 187 which is affixed to slide mount movable slide 210 and which passes through a hole in stop bracket 186, and first and second jam nuts 188, 189 which are jammed together and threaded onto stop rod 187 so as to limit the travel of slide mount movable slide 210 in the direction toward rail 15. Slide stop 183 may also comprise one or both of third and fourth jam nuts 191, 192 which may be threaded onto stop rod 187 so as to limit the travel of slide mount movable slide 210 in the gage direction. Third and fourth jam nuts 191, 192 maybe omitted if the contact of slide mount movable slide 210 with slide bracket 186 sufficiently limits the gauge direction travel of slide mount movable slide 210.

Mill motor mount 185 is fixedly attached to slide mount movable slide 210 and to mill motor 190. Mill motor mount 185 rotatably houses mill spindle 195. Mill spindle 195 rotatably connects mill motor 190 with mill head 200 along drive axis 230. Mill motor mount 185 is mounted onto slide mount movable slide 210 so as to fixedly establish angle a between drive axis 230 and vertical line 225 which extends perpendicularly from the horizontal plane containing rail head top surface apex 19. Mill head 200 is thereby disposed at angle $\alpha$ to rail 15. The magnitude of angle $\alpha$ depends on the configuration of the switch point pocket that is to be milled into rail head 18. For example, when apparatus 10 is to be adapted to mill a switch point pocket according to the Samson Switch point design, the magnitude of angle $\alpha$ is about 18 degrees, 25 minutes plus or minus about 30 minutes.

Mill head 200 is an end mill tool having sufficient length 235 to mill a switch point pocket into rail 15 without the need to index mill head 200 along drive axis 230. Mill head 200 may be a monolithic tool or may comprise a mounting head and a plurality of removable cutting inserts. Mill head diameter 240 is selected in accordance with the operating rotational speed of mill motor 190 so as to provide the proper linear mill head speed for milling rail 15 efficiently without excessive tool wear. Mill head diameter 240 must also be sufficiently small so as to allow mill head 200 to fit into the narrowest approach of rail head 15 to switch rail head 250 in the region to be cut when the switch is in the open position. The milling tool portion of mill head 200 may be made of any material that is suitable for milling rail head 15 including high speed tool steel, tungsten carbide, cermets, and coated versions of these materials. Preferably, mill head 200 is a milling tool comprising an arbor mounted insert mounting head having a plurality of removable TiN coated tungsten carbide inserts. A milling tool that has been found suitable for use as mill head 200 is available from Iscar, of Mansfield, Tex., part number SM-D2.50-1.50-1.00 with ADKT 1505 PD-R inserts.

Referring to FIG. 3, lateral feeding means 255 is affixed to base plate 20 for longitudinally displacing apparatus 10 along rail 15 at a controllable and constant rate to provide for laterally feeding mill head 200 along rail 15 during the milling of a switch point pocket into rail 15. Feeding means 255 comprises winch 260 and winch motor 265. Feeding means 255 also comprises cable rail anchor 270, as shown in more detail with reference to FIG. 6. Winch motor 265, a reversible direction motor, is coupled to winch 260 so as to drive winch 260 to feed out or draw in cable 275 or to release the tension on cable 275. Preferably, winch 260 includes quick-release clutch 267 releaseably coupling winch motor 265 to winch 260 to permit the easy uncoupling of switch motor 265 from winch 260 so that cable 275 can be manually drawn out at a rapid rate. Alternatively, winch motor 265 may be a single drive direction motor releaseably coupled to winch 260 so as to drive winch 260 to draw in cable 275. In either embodiment, winch motor 265 must be capable of driving winch 260 in such a manner that when cable 275 is attached to cable rail anchor 270, the drawing in of cable 275 by winch 260 propels apparatus 10 at a controllable and constant rate along rail 15 thus moving mill head 200 at a controllable and constant lateral feed rate along rail 15 during the milling of a switch point pocket into rail 15. A model DH 100 reversible direction hydraulic motor from Danfoss, Fluid Power of Racine, Wisconsin, has been found to be suitable for winch motor 265.

Figure 7:
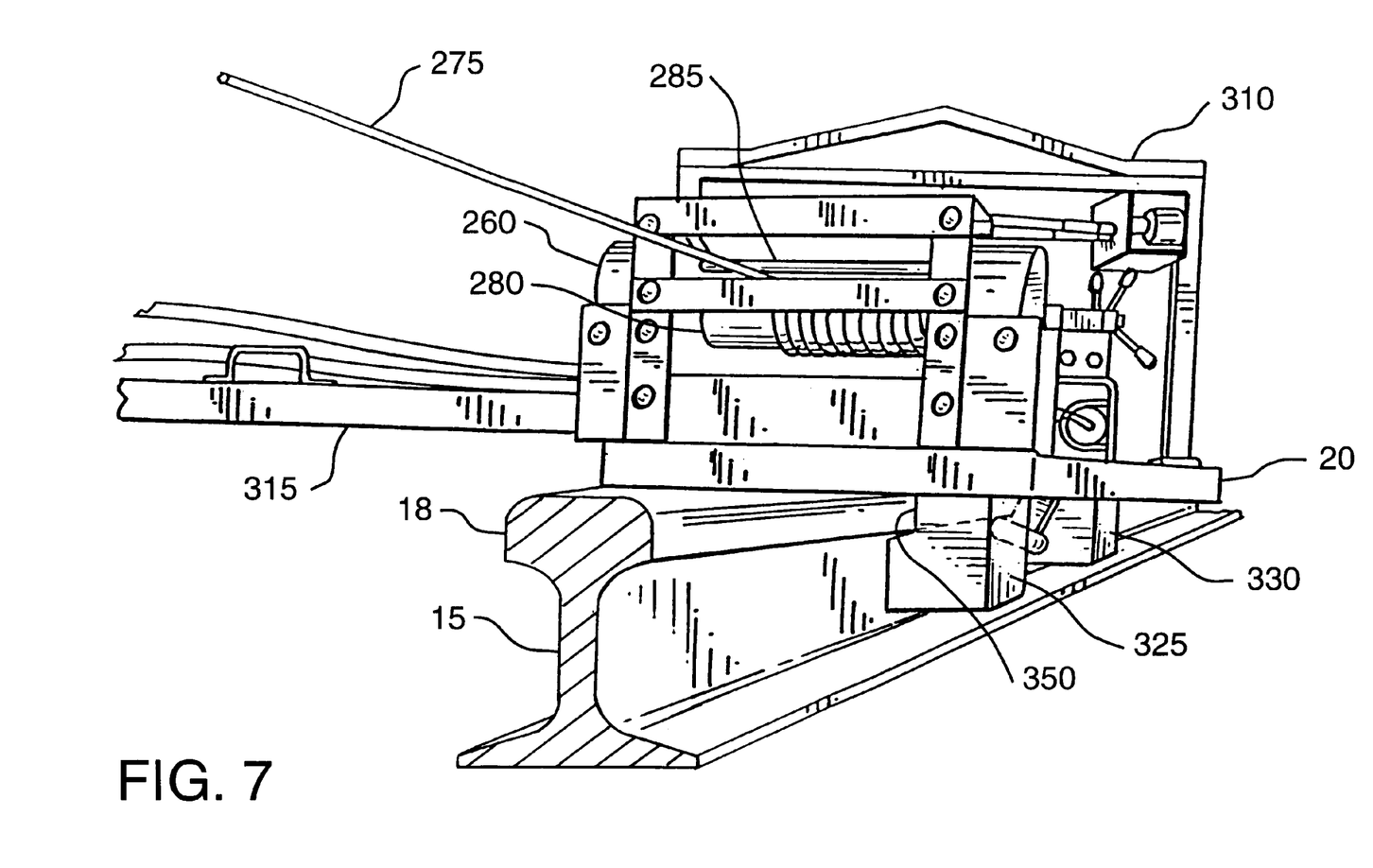
FIG. 7 is an isometric view of the rail milling apparatus mounted upon a stock rail that is to be milled.

Referring to FIG. 7, cable reel 280 of winch 260 is preferably sized so as to take up in a single wrap a length of cable 275 that is longer than the longest switch point pocket length that is to be milled. For example, if the longest switch point pocket length that is to be milled is to 25 feet, then cable reel 275 is preferably sized so as to take up in a single wrap a length of cable longer than 25 feet. The use of a single wrap cable reel enhances the constancy of the lateral feed rate of milling head 200 along rail 15 during the milling operation. Preferably, winch 260 also includes a tension leveler bar 285 which applies tension to cable 275 while cable 275 is being drawn in by winch 260 so that cable 275 wraps onto cable reel 280 in a single, continuous wrap. A winch that has been found suitable for use as winch 260 is a reversible hydraulic winch model H-200 series with a ram-lock clutch from Ramsey Winch, Tulsa, Okla.

Figure 6:
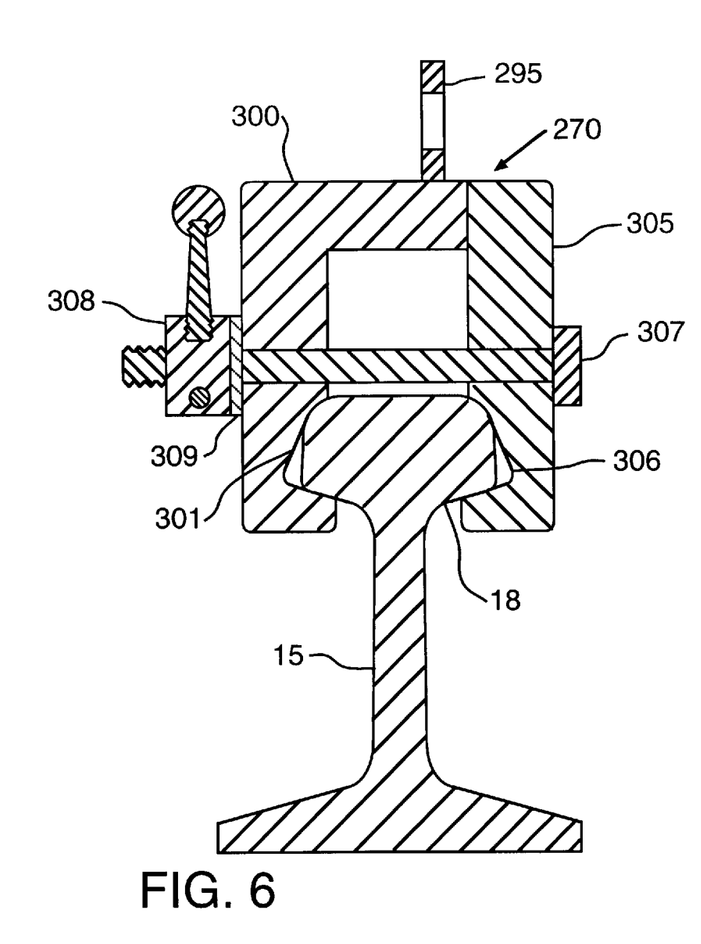
FIG. 6 is a cross-sectional view of a cable rail anchor.
Figure 8:
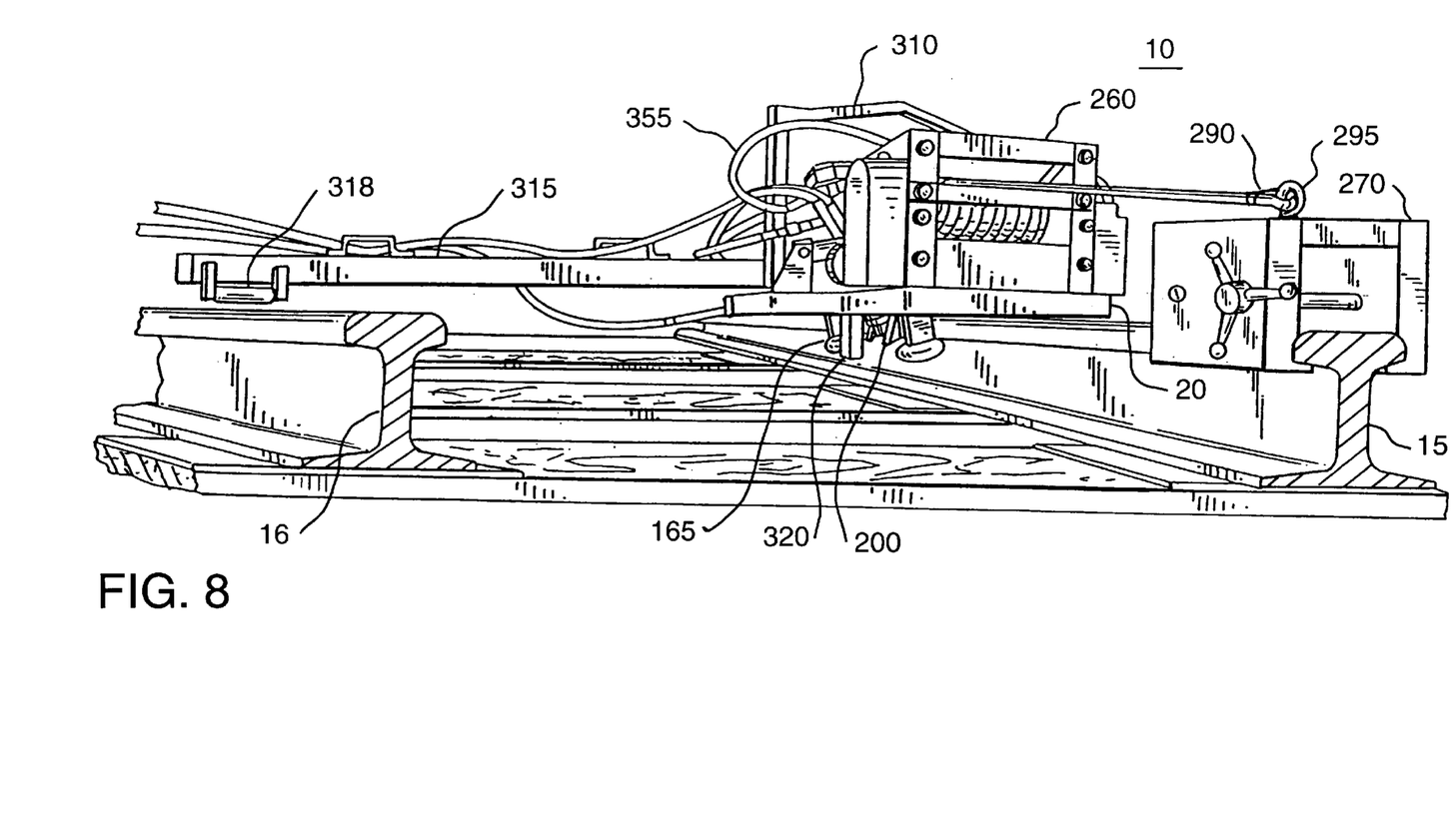
FIG. 8 is an isometric view of the rail milling apparatus mounted upon a stock rail that is to be milled. The switch rails have been omitted for ease of viewing.

Referring to FIG. 8, cable rail anchor 270 removably attaches to rail 15. Cable 275 attaches to cable rail anchor 270 by way of cable clevis 290 and anchor eye bolt 295 so as to allow winch 260 to move apparatus 10 along rail 15 at a controllable and constant rate during the milling operation. Cable rail anchor 270 may be of any design which permits cable 275 to be quickly, removably, and firmly attached to rail 15. Referring now to FIG. 6, cable rail anchor 270 preferably comprises first and second mating halves 300, 305 having clamping surfaces 301, 306, respectively, which are adapted to fit about rail head 18, anchor eye bolt 295, and two anchor bolts 307 and corresponding hand wheel nuts 308 and washers 309. Eye bolt 295 is bolted to one of anchor first and second mating halves 300, 305 preferably so as to be positioned directly in the center of the top of cable rail anchor 270 and over the center line of rail 15. To attach cable rail anchor 270 to rail 15, hand wheel nuts 308 are first loosened so that clamping surfaces 301, 306 of anchor first and second mating halves 300, 305, respectively, can be positioned around rail head 18. Then hand wheel nuts 308 are tightened, thereby clamping rail head 18 tightly between clamping surfaces 301, 306 of anchor first and second mating halves 300, 305, respectively.

Apparatus 10 also includes components which facilitate the positioning of apparatus 10 onto rail 15 while protecting mill head 200 against impact damage. Lifting bridge 310, outrigger 315 and gauge side guide 320 are illustrated in FIG. 8 and field side front and rear guides 325, 330 are illustrated in FIG. 7. Lifting bridge 310 is adapted to facilitate hoisting apparatus 10 onto and off of rail 15, as well as onto and off of a transportation vehicle such as a crew truck. Outrigger 315 is attached to base plate 20 by means of outrigger bracket 335 into which outrigger 315 is locked into place by means of outrigger locking bolts 340, as shown in reference to FIG. 3. Outrigger 315 can be removed from apparatus 10 to facilitate transportation of apparatus 10. Referring additionally to FIG. 8, outrigger roller 318 is rotatably attached to the remote end of outrigger 315. Outrigger 315 acts to protect mill head 200 when apparatus 10 is being hoisted onto or off of track 15 by limiting the degree of angle that apparatus 10 can tilt towards the gauge side of rail 15. If the degree of tilting becomes too severe, outrigger roller 318 contacts opposing rail 16 preventing any further tilting of apparatus 10 in that direction. However, outrigger roller 318 does not engage opposing rail 16 during the milling operation after apparatus 10 has been levelly clamped onto track 15.

Referring to FIG. 7, field side front and rear guides 325, 330 are affixed to the underside of base plate 20. Field side front and rear guides 325, 330 preferably have an indentation, such as indentation 350, for receiving rail head 18 as apparatus 10 is being placed onto rail 15. However, field side front and rear guards 325, 330 do not engage rail head 18 during the milling operation after apparatus 10 has been levelly clamped onto track 15.

Referring to FIG. 8, gauge side guide 320 is affixed to the underside of base plate 20 between mill head 200 and second pinch roller 165 of rear pinch roller assembly 85. Gauge side guide 320 is positioned so as to protect mill head 200 from contacting rail 15 when mill head 200 is in the parked position and apparatus 10 is being located onto or off from rail 15.

Figure 9:
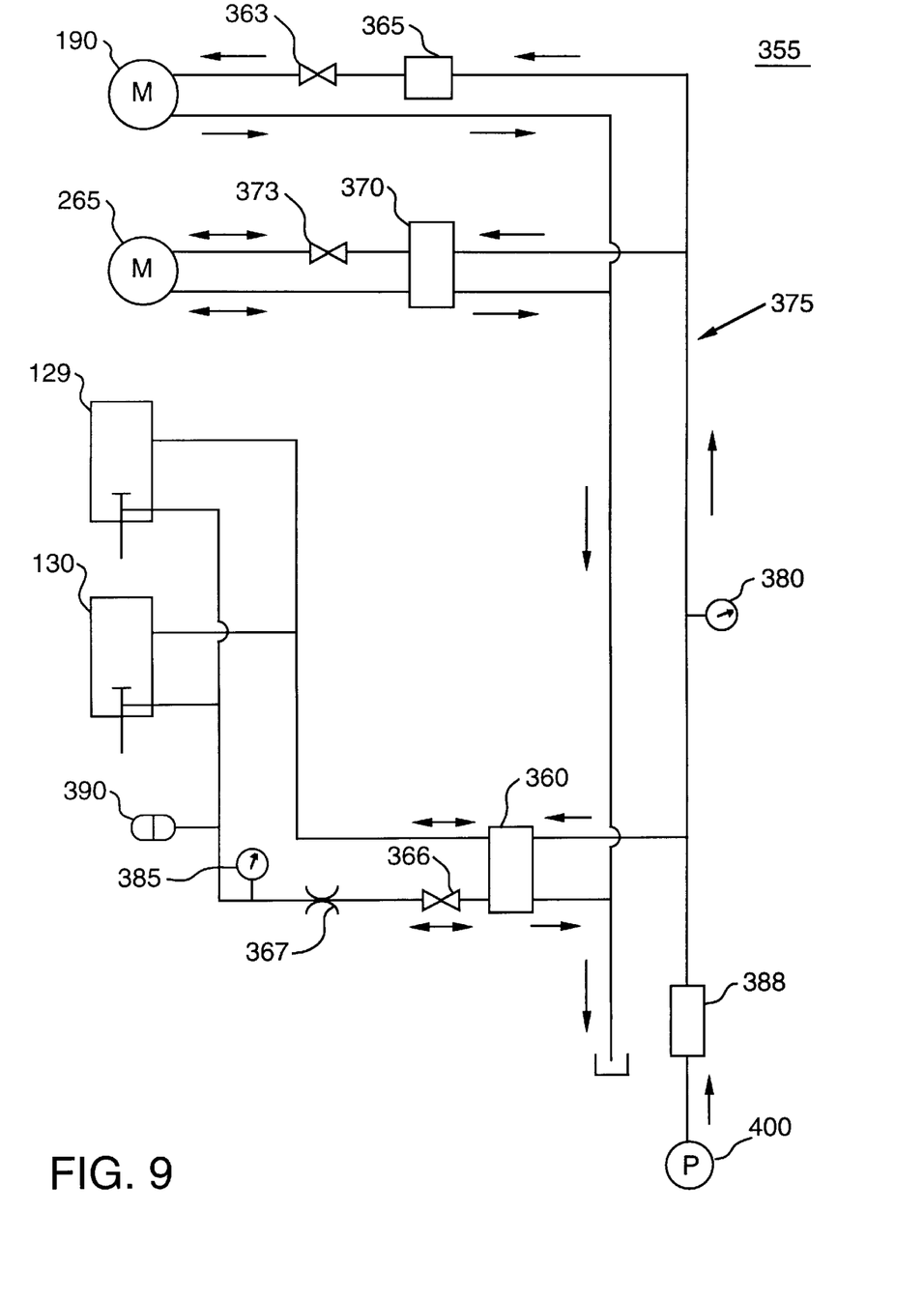
FIG. 9 is a schematic drawing of the hydraulic system of the rail milling apparatus.

Referring to FIG. 9, apparatus 10 also includes a hydraulic distribution and control system 355 comprising first, second, and third hydraulic controls 360, 365, 370, hydraulic lines 375, first and second hydraulic pressure gauges 380, 385, flow meter 388, first and second lockable flow control valves 363, 373, holding valve 366, flow metering orifice 367, and accumulator 390. Hydraulic distribution and control system 355 also includes the hydraulic fittings and other incidental components necessary for interconnecting the hydraulic components as are well known in the art. Hydraulic distribution and control system 355 may also include one or more distribution manifolds as are well known in the art for distributing the flow of the hydraulic fluid. Hydraulic power is supplied by auxiliary hydraulic pump 400 which is a portable hydraulic pump of a type well known in the art. Preferably, auxiliary hydraulic pump 400 is capable of supplying hydraulic fluid at a rate of about 10–19 gallons/minute and a pressure of about 1800–2200 psi. More preferably, auxiliary hydraulic pump 400 is capable of producing about 14 gallons/minute and a pressure of about 2000–2200 psi. First hydraulic pressure gauge 380 is used to monitor the pressure of hydraulic fluid output of auxiliary hydraulic pump 400 and flow meter 388 is used to measure the flow rate of the hydraulic fluid output of auxiliary hydraulic pump 400.

Although variable control flow valves may be included in hydraulic distribution and control system 355, to simplify the operation of apparatus 10, hydraulic distribution and control system 355 is preferably constructed such that, other than for on/off and directional flow controls, flow volume rate is controlled by component sizing or by lockable flow control valves, such as first and second lockable flow control valves, 363, 373, rather than by adjustable valving that is employed during the field operation of apparatus 10. Thus, first, second, and third hydraulic controls 360, 365, 370, are used as on/off flow controls. First and third hydraulic controls 360, 370 are also used as directional flow controls.

First hydraulic control 360 is used to control front and rear double-acting pistons 129, 130 of front and rear pinch roller assemblies 80, 85, respectively. First hydraulic control 360 is a three position control having a forward flow position, a neutral no-flow position, and a reverse flow position. The forward flow position supplies fluid to front and rear double acting-pistons 129, 130 to cause front and rear pinch roller assemblies 80, 85 to open. The reverse flow position supplies fluid to front and rear double-acting pistons 129, 130 in the reverse direction causing front and rear pinch roller assemblies to close and clamp against rail 15. The neutral no-flow position maintains pressure in front and rear double-acting pistons 129, 130 causing front and rear pinch roller assemblies 80, 85 to remain in position under pressure. Flow metering orifice 367 is included in the flow circuit between first hydraulic control 360 and front and rear double-acting pistons 129, 130 to regulate the speed at which front and rear roller assemblies 80, 85 open and close. Preferably, flow metering orifice 367 has a orifice diameter in the range of about 0.010–0.030 inches. Accumulator 390 is included in the flow line supplying reverse fluid flow to front and rear double acting pistons 129, 130 as a safeguard to help insure that front and rear pinch roller assemblies 80, 85 continue to clamp apparatus 10 to rail head 18 when first hydraulic control 360 is in the neutral no flow position during the milling operation. Second hydraulic pressure gauge 385 is used to monitor the hydraulic pressure on front and rear double-acting pistons 129, 130. Preferably, accumulator 390 has a dry-side bladder pressure of at least about 1000 psi. A holding valve having a leakage rating of about one drop/minute, such as holding valve 366, is used to help maintain the hydraulic pressure on double-acting pistons 129, 130 while they are causing front and rear pinch roller assemblies 80, 85 to clamp apparatus 10 to rail 15. As illustrated with reference to FIG. 2, accumulator 390 is mounted on hydraulic device mount 395. Also mounted on hydraulic device mount 395 is mounting subplate distribution manifold 387 upon which is mounted first, second, and third hydraulic controls 360, 365, 370 and holding valve 366.

Second hydraulic control 365 controls the fluid flow to mill motor 190. Second hydraulic control 365 is a two position control having only forward flow and neutral no-flow positions. The forward flow position supplies fluid flow to mill motor 190 thus causing mill motor 190 to provide mill head 200 with the torque needed for milling rail head 18. The neutral no-flow position cuts off the fluid flow to mill motor 190 thus eliminating the torque on mill head 200. Preferably, a lockable fluid flow control valve having an flow range of between about 0–12 gallons/minute, such as first lockable flow control valve 363, is used to lockably set the flow volume rate to mill motor 190 prior to field use of apparatus 10.

Third hydraulic control 370 is used to control winch motor 265. As was described above, when cable 275 is attached to cable rail anchor 270, reeling in cable 275 causes apparatus 10 to be pulled along rail 15 at a constant speed thus providing a constant lateral feed rate for mill head 200 to mill rail head 18. Winch motor 265 in the reversible embodiment is utilized in conjunction with a three position third hydraulic control 370 similar to first hydraulic control 360. The forward flow position is used to cause winch motor 265 to turn winch 260 so as to play out cable 275; the neutral position to cause winch motor 265 to hold winch 260 stationary; and the reverse flow position to cause winch motor 265 to turn winch 260 to reel in cable 275. Alternatively, when a single direction hydraulic motor is utilized in a second embodiment of the device, then third hydraulic control 370 is a two position control having only one direction flow and neutral no-flow positions which function to cause winch 260 to draw in cable 275 and to be held stationary, respectively. Preferably, a lockable fluid flow control valve having an flow range of between about 0–6 gallons/minute, such as second lockable flow control valve 373, is used to lockably set the flow volume rate to winch motor 265 prior to field use of apparatus 10.

Although apparatus 10 has been described as having hydraulically, that is fluid, driven components, it is also within the contemplation of the invention that one or more of those components be driven by other portable power sources such as, for example electricity, fossil fuel or compressed air. Thus, it is within the contemplation of the invention that one or more of those components to comprise a hydraulic motor, an electric motor, a fossil fuel motor, a compressed air motor, or a gear motor driven by a hydraulic, electric, fossil fuel, or compressed air motor. It is well within the skill of one skilled in the art to adapt apparatus 10 for use with other power sources. In making such adaptations, one skilled in the art will understand also how to adapt the power supply lines and controls necessary to operate the substituted components.

In operation, apparatus 10 is intended to be transported by crew truck to the field site of the switch to be milled. At the field site, outrigger 315 is attached to base plate 20 of apparatus 10 by means of outrigger bracket 335 and secured with outrigger locking bolts 340. Micrometer handle 215 of the micrometer mechanism of slide mount 180 is operated to move mill head 200 to the full-out position to give as much clearance as possible between mill head 200 and rail 15 during the placing of apparatus 10 onto the railroad tracks. A crane is used to lift apparatus 10 by lifting bridge 310 onto rail 15. During the placement of apparatus 10 onto rail 15, field side front and rear guides 325, 330 are used to help guide apparatus 10 into position on rail 15 and gauge side guide 320 prevents mill head 200 from coming into contact with switch rail 245. Outrigger 315 prevents apparatus 10 from tilting too far over to the gauge side and also may partially support apparatus 10 by its contact with opposing rail 16 after the crane is disengaged if the disengagement is made prior to the activation of front and rear pinch roll assemblies 80, 85 to clamp apparatus 10 onto rail 15.

After apparatus 10 has been placed on rail 15, the crane is disengaged from lifting bridge 310. First, second, and third hydraulic controls 360, 365, 370 are placed in the neutral no-flow positions and then hydraulic supply and return lines from an auxiliary hydraulic pump are attached to hydraulic lines 375 of apparatus 10. First control 360 is operated to cause front and rear double-acting pistons 129, 130 to close front and rear pinch roller assemblies 80, 85 upon rail 15 thereby rollably clamping apparatus 10 to rail 15. Holding valve 366 is closed to maintain the hydraulic pressure on front and rear double-acting pistons 129, 130.

The location of apparatus 10 with respect to rail 15 is checked by manual measurement to ensure that across its width from gage side to field side the bottom of base plate 20 is substantially parallel with the horizontal plane containing rail head top surface apex 19. If necessary, apparatus 10 is then leveled on rail head 18 using front and rear adjustment studs 116. The position of front and rear adjustment studs 116 are then locked in place by tightening adjustment stud locking screws 118. Quick-release clutch 267 is operated to allow cable 275 to be manually drawn out to a length that is a few feet longer than the length of the switch point pocket cut that is to be milled into rail head 18. Cable 275 is then attached to cable rail anchor 270 which has been clamped onto rail 15 ahead of the section of rail 15 that is to be milled. Third hydraulic control 370 is then operated to cause winch 260 to draw in cable and to thereby pull apparatus 10 along rail 15 to the spot where the milling of the switch point pocket is to begin. Front roller brake lock 72 is then operated to bring brake pad 73 into contact with the top surface of front support roller 70 to provide sufficient restraint to the free rotation of front support roller 70 to regulate the speed of apparatus 10 upon rail 15 during the milling operation so as to produce a substantially constant feed rate of mill head 200 along rail 15. Second hydraulic control 365 is then operated to cause mill motor 190 to apply torque to mill head 200. Micrometer handle 215 is operated to bring mill head 200 into grazing contact with rail head 18.

Apparatus 10 is now ready to begin milling rail head 18. Third hydraulic control 370 is operated to cause winch 260 to start moving apparatus 10 along rail 15. As apparatus 10 begins to move, micrometer handwheel 215 is operated to cause mill head 200 to make a tapered cut into rail head 18 over a length of about 3 inches by gradually increasing the depth of cut to about 0.5 inches. The depth of cut is then locked in by engaging slide mount locking mechanism 220 into a locking position. Apparatus 10 is then allowed to continue milling rail head 18 at a linear feed rate of about 11 to 12 inches per minute as winch 260 pulls apparatus 10 along rail 15. When mill head 200 reaches the end of the portion of rail head 18 that is to be full-depth milled, slide mount locking mechanism 220 is released and micrometer handwheel 215 is operated to gradually taper out the cut over a length of about 3 inches. Second hydraulic control 365 is then operated to stop the flow of fluid to mill motor 190. The first milling pass has been completed.

Micrometer hand wheel 215 is then used to back mill head 200 away from rail head 18. Third hydraulic control 370 is then operated to cause winch 260 to release the tension on cable 275. First hydraulic control 360 is operated to unclamp apparatus 10 from rail 15. Front roller brake lock 72 is then released and quick release clutch 267 is operated to allow cable 275 to be manually drawn out and apparatus 10 is manually rolled back to the milling start position of the switch point pocket to begin the next pass. First hydraulic control 360 is then operated to clamp apparatus 10 to rail 15. Front roller brake lock 72 is again engaged as it was for regulating the speed of apparatus 10 during the first pass. Third hydraulic control 370 is then operated to cause mill motor 190 to apply torque to mill head 200. Mill head 200 again is brought into grazing contact with rail head 18. The procedures for making the first milling pass are then repeated except that the depth of cut is shallower on the second and later passes, with the second pass depth of cut being on the order of about 0.125 inches. Typically, two or three passes are required to mill the switch point pocket to full depth of approximately ⅝ inches After the completion of the final pass, mill head 200 is moved into the backed out position. Third hydraulic control 270 is operated to release the tension on cable 275. Then cable 275 is uncoupled from cable rail anchor 270 and third hydraulic control 370 is operated to cause winch 260 to reel in cable 275. Cable rail anchor 270 is then removed from rail 15. Holding valve 366 is opened and first hydraulic control 360 is operated to open front and rear pinch roll assemblies 80, 85 thereby unclamping apparatus 10 from track 15. The supply and return lines to auxiliary hydraulic pump 400 are then disconnected from hydraulic lines 375. Apparatus 10 is then crane lifted by lifting bridge 310 back onto the crew truck and outrigger 315 is removed.

In operating apparatus 10, it is advantageous to mark out on rail 15 the start, stop, and taper zone points of the switch point pocket that is to be milled. It is also advantageous to place between rail 15 and switch rail 245 a long piece of flexible material to catch the milling chips and debris that are produced by the milling operation.

EXAMPLE I

A field test was conducted on an apparatus and method in accordance with the present invention as described above. The tested apparatus was powered by an auxiliary portable-hydraulic pump that supplied a fluid flow of about 14 gallons/minute and a pressure of 1800–2200 psi. The tested apparatus included: as mill motor 190, a reversible direction hydraulic motor, Model RSA 03524-50A from Von Ruden Hydmotor, Buffalo, Minn.; as winch motor 265, a reversible direction hydraulic motor, model DH 100 from Danfoss, Fluid Power of Racine, Wis.; as winch 260, winch model H-200 series with a ream-lock clutch from Ramsey Winch, Tulsa, Okla.; as front and rear double-acting pistons 129, 130, hydraulic cylinders model number 1½ HHTR2 from Sheffer Corporation, Cincinnati, Ohio; as mill head 200, an arbor mounted multi-insert milling head model number SM-D2.50-1.50.1.00 with ADKT 1505 PD-RTiN coated tungsten carbide milling inserts from Iscar, Mansfield, Tex.; and as slide mount 180, a dovetail slide assembly Model 200, manufactured by Master Machine Tools, Hutchinson, Kans., modified to reduce the length of fixed slide 205 from 16 inches to 12 inches. The mill assembly was mounted to establish angle a between the drive axis and a vertical line extending perpendicular from the horizontal plane containing the rail head at a magnitude of approximately 18 degrees, 25 minutes.

The mill motor operated with a rotational speed during milling of about 500 RPM and at a flow rate of about 12 gallons/minute at an operating pressure of about 800–900 psi. The winch had a 25 foot first-wrap capacity and a 60:1 worm gear ratio. The winch motor operated at a fluid flow of about 1.3 gallons/minute and produced a lateral feed rate of the milling head during milling of about 11–12 inches/minute. The total weight of the tested apparatus was about 1100 pounds. Each of the double-acting pistons supplied about 2900 pounds of clamping force at a hydraulic pressure of about 2000 psi. The front and rear first and second clamping rollers were made of heat treated 4140 steel.

The tested apparatus was transported to the field site by a crew truck and was lowered by crane onto the rails. A Samson Switch style switch point pocket 12 feet long was milled into a 133 RE stock rail of a #10 size switch in two passes with each pass taking about 12 minutes. The rail temperature before milling was 96 degrees Fahrenheit and at the finish of milling was 115 degrees Fahrenheit. One skilled in the art will recognize that the increase in rail temperature was not sufficient to significantly affect the stress state of CWR stock rail. The elapsed time for milling was 56 minutes.

EXAMPLE II

A field test was conducted using an apparatus and method in accordance with the present invention as described in Example 1. Again the tested apparatus was transported to the field site by a crew truck and crane lowered onto the rails. A Samson Switch style switch point pocket 8 feet 9.5 inches long was milled into a 133 RE stock rail of a #10 size switch in three passes with each pass taking about 11 minutes. The rail temperature before milling was 108 degrees Fahrenheit and after milling about 120 degrees Fahrenheit. One skilled in the art will recognize that the increase in rail temperature was not sufficient to significantly affect the stress state of CWR stock rail. The elapsed time for milling was about 45 minutes.

EXAMPLE III

A field test was conducted using an apparatus and method in accordance with the present invention as described in Example 1. Again the tested apparatus was transported to the field site by crew truck and crane lowered onto the rails. A Samson Switch style switch point pocket 14 feet long was milled into a 133 RE stock rail of a #14 size switch in three passes with each pass taking about 14 minutes. The rail temperature before milling was 92 degrees Fahrenheit and after milling about 96 degrees Fahrenheit. One skilled in the art will recognize that the increase in rail temperature was not sufficient to significantly affect the stress state of CWR stock rail. Elapsed time for milling was about 60 minutes.

While only a few presently preferred embodiments of the invention are described, it is to be distinctly understood that the invention is not limited thereto but may be otherwise embodied and practiced within the scope of the following claims.

What is claimed is:

1. An apparatus for milling a pocket into a stock rail for receiving a switch rail point, the apparatus comprising:
   a) a base plate;
   b) supporting means affixed to said base plate for supporting said apparatus on said stock rail, said supporting means further permitting the displacement of said apparatus along said stock rail;
   c) clamping means affixed to said base plate for selectively clamping said apparatus to said stock rail, said clamping means further permitting the displacement of said apparatus along said stock rail when engaged thereto;
   d) milling means affixed to said base plate, said milling means adapted to selectively engage and mill said pocket into said stock rail at a preselected angle and variable depth; and
   e) feeding means affixed to said base plate and additionally adapted to selectively engage said stock rail, and to propel said apparatus along said stock rail at a controlled speed for a preselected distance.

2. The apparatus described in claim 1, wherein the clamping means further comprises a plurality of pinch rollers.

3. The apparatus described in claim 2, wherein at least one of said plurality of pinch rollers includes a flanged profile adapted to conform to the lateral surface said of stock rail.

4. The apparatus described in claim 1, wherein said clamping means further comprises at least one double-acting piston.

5. The apparatus described in claim 4, wherein said at least one double-acting piston is powered by a fluid power source.

6. The apparatus described in claim 1, wherein said clamping means is powered by a power source selected from the group consisting of an electrical power source, a fossil fuel power source, and a compressed air power source.

7. The apparatus described in claim 1, wherein said feeding means further comprises a winch and a cable rail anchor adapted to be mounted to said stock rail at a preselected distance from said apparatus, said winch having a cable adapted to connect said apparatus to said cable rail anchor.

8. The apparatus described in claim 7, wherein said winch further comprises a tension leveler bar.

9. The apparatus described in claim 7, wherein said feeding mechanism further comprises a quick-release clutch for decoupling said winch motor from said winch.

10. The apparatus described in claim 7, wherein said winch motor is selected from the group consisting of a hydraulic motor, an electric motor, a fossil fuel motor, a compressed air motor, and a gear motor.

11. The apparatus described in claim 10, wherein said winch motor is a reversible direction motor.

12. The apparatus described in claim 1, further comprising a means for leveling said apparatus on said stock rail.

13. The apparatus described in claim 1, wherein said milling means further comprises a mill head for milling said stock rail.

14. The apparatus described in claim 13, wherein said mill head rotates about a drive axis, said drive axis being disposed at an angle to a reference line, said reference line being perpendicular to a horizontal plane containing the top surface apex of said stock rail.

15. The apparatus described in claim 14, wherein said angle of disposition is about 17 degrees 55 minutes to about 18 degrees 55 minutes.

16. The apparatus described in claim 15, wherein said angle of disposition is about 18 degrees 25 minutes.

17. The apparatus described in claim 13, wherein said mill head further comprises a plurality of removable cutting inserts.

18. The apparatus described in claim 17, wherein said plurality of removable cutting inserts includes at least one cutting insert made of tungsten carbide.

19. The apparatus described in claim 18, wherein said tungsten carbide cutting insert is coated with titanium nitride.

20. The apparatus described in claim 1, wherein said milling means further comprises a mill motor selected from the group consisting of a hydraulic motor, an electric motor, a fossil fuel motor, a compressed air motor, and a gear motor.

21. The apparatus described in claim 1, further comprising an adjustable slide mount for mounting said milling means on said base plate.

22. The apparatus described in claim 21, wherein said adjustable slide mount further comprises a dove-tail slide mount.

23. The apparatus described in claim 22, wherein said adjustable slide mount further comprises a fixed slide and a movable slide.

24. The apparatus described in claim 23, further comprising a micrometer for controlling the position of the movable slide relative to the fixed slide.

25. The apparatus described in claim 1, further comprising a means for braking the movement of said apparatus along said stock rail.

26. The apparatus described in claim 1, wherein said base plate has a bottom side, said apparatus further comprising at least one guide attached to said bottom side of said base plate.

27. The apparatus described in claim 26, wherein said at least one guide is affixed such that when said apparatus is positioned on said stock rail said at least one guide is disposed adjacent said stock rail.

28. The apparatus described in claim 26, wherein said at least one guide further comprises an indentation for receiving the rail head of said stock rail.

29. The apparatus described in claim 1, further comprising an outrigger affixed to said base plate, said outrigger adapted to limit the tilt of the apparatus in the gauge direction.

30. The apparatus described in claim 29, wherein said outrigger is removably attached to said apparatus.

31. The apparatus described in claim 1, further comprising a power supply means.

32. The apparatus described in claim 31, wherein said power supply means is a hydraulic power supply.

33. The apparatus described in claim 32, wherein said hydraulic power supply is adapted to supply about 10–19 gallons of hydraulic fluid per minute.

34. The apparatus described in claim 32, wherein said hydraulic power supply is adapted to supply a pressure of about 1800–2200 pounds per square inch.

35. The apparatus described in claim 31, further comprising at least one hydraulic control to divert hydraulic fluid for the operation of at least one of said milling means, said clamping means, and said feeding means.

36. The apparatus described in claim 31, wherein said power supply means is selected from the group consisting of an electric power supply, a fossil fuel power supply, and a compressed air power supply.

* * * * *

UNITED STATES PATENT AND TRADEMARK OFFICE
CERTIFICATE OF CORRECTION

PATENT NO. : 6,033,166
DATED : March 7, 2000
INVENTOR(S) : Hampel

It is certified that error appears in the above-identified patent and that said Letters Patent is hereby corrected as shown below:

Column 1,
Line 35, "rail head 18 position" should read -- rail head 18 at a position -- .

Column 2,
Line 42-43, "which utilize" should read -- utlilizing --.

Column 5,
Line 4, "maybe" should read -- may be --;
Line 17, "FIG. 4A and 4B" should read -- FIGS. 4A and 4B, --.
Line 19, "FIG. 4C and 4D has" should read -- FIG. 4C and 4D, has --.
Lines 47-48, "and 4D adjustable" should read -- and 4D, adjustable --.

Column 6,
Line 7, "dovetail" should read -- dove-tail --;
Line 14, "amount travel" should read -- amount of travel --;
Line 32, "gage" should read -- gauge --;
Line 41, "angle a" should read -- angle $\alpha$ --;

Column 7,
Line 38, "is to 25 feet" should read -- is 25 feet --.

Column 8,
Line 35, "rear guards" should read -- rear guides --.

Column 9,
Line 10, "valves, 363" should read -- valves 363 --;
Line 32, "a orifice" should read -- an orifice --;
Line 35, "double acting" should read -- double-acting --;
Line 38, "no flow" should read -- no-flow --;
Lines 61-62, "an flow range" should read -- a flow range --.

Column 10,
Line 18, "an flow range" should read -- a flow range --.
Line 26, "for example electricity" should read -- for example, electricity --.

Column 11,
Line 3, "gage" should read -- gauge --;
Line 15, "cable and" should read -- cable 275 and --;
Line 65, "full depth" should read -- a full depth --;
Line 65, "inches" should read -- inches. --.

UNITED STATES PATENT AND TRADEMARK OFFICE
CERTIFICATE OF CORRECTION

PATENT NO.    : 6,033,166
DATED         : March 7, 2000
INVENTOR(S)   : Hampel

It is certified that error appears in the above-identified patent and that said Letters Patent is hereby corrected as shown below:

Column 12,
Line 22, "portable-" should read -- portable --;
Line 26 "03524-50A" should read -- 035-24-50A --
Line 35, SM-D2.50-1.50.1.00" should read -- SM-D2.50-1.50-1.00
Line 41, "angle a" should read -- angle α --.

Column 13,
Line 3, "Example 1" should read -- Example I --;
Line 7, "8 feet 9.5 inches" should read -- 8 feet, 9.5 inches --;
Line 20, "Example 1" should read -- Example I --.

Signed and Sealed this

Twelfth Day of February, 2002

Attest:

JAMES E. ROGAN
*Attesting Officer*     *Director of the United States Patent and Trademark Office*